(No Model.) 3 Sheets—Sheet 2.
G. J. HAAS.
CORN PLANTER.
No. 585,095. Patented June 22, 1897.
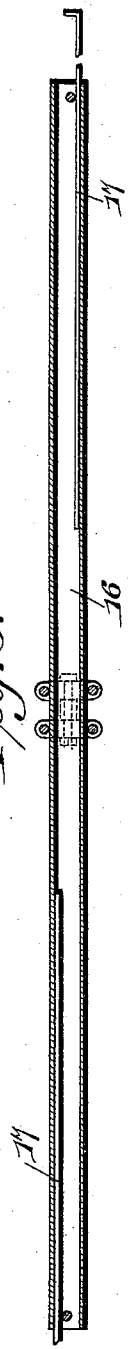
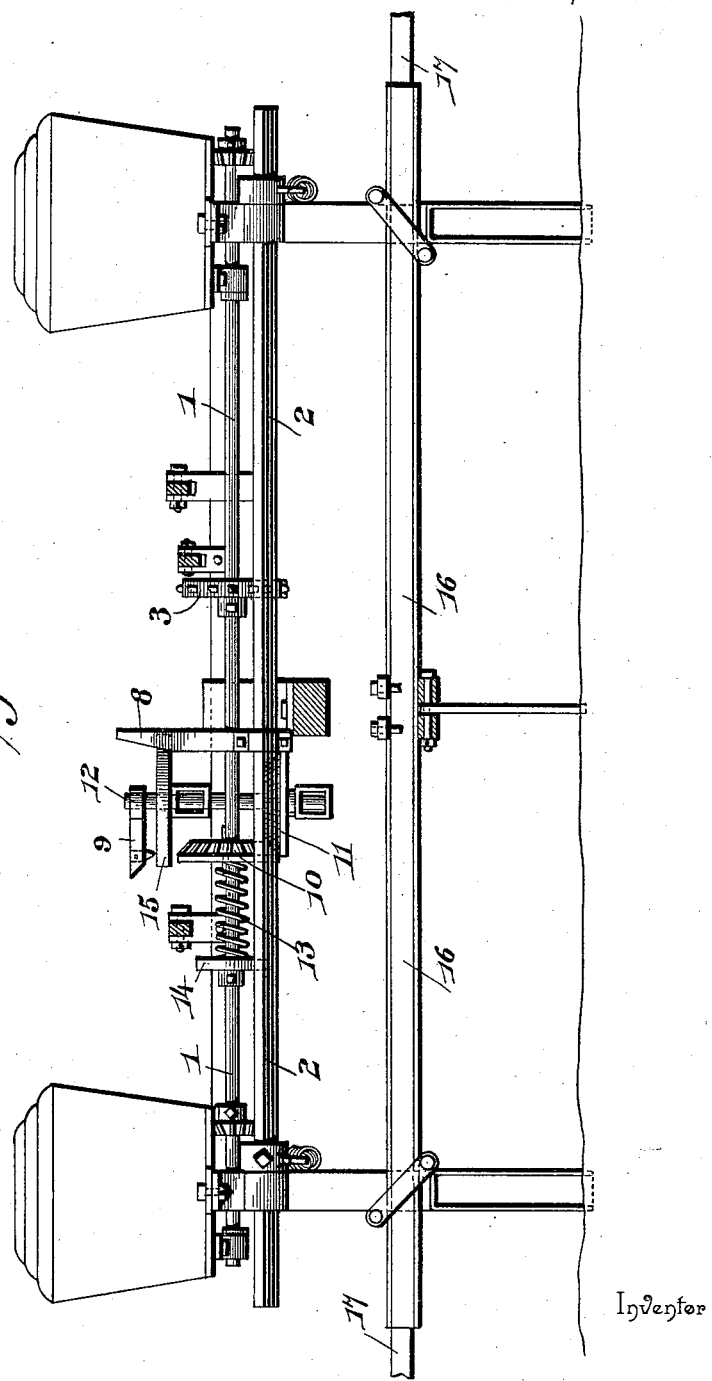
Witnesses
Jas. K. McCathran
V. B. Hillyard.
Inventor
By his Attorneys, George J. Haas
C. A. Snow & Co.

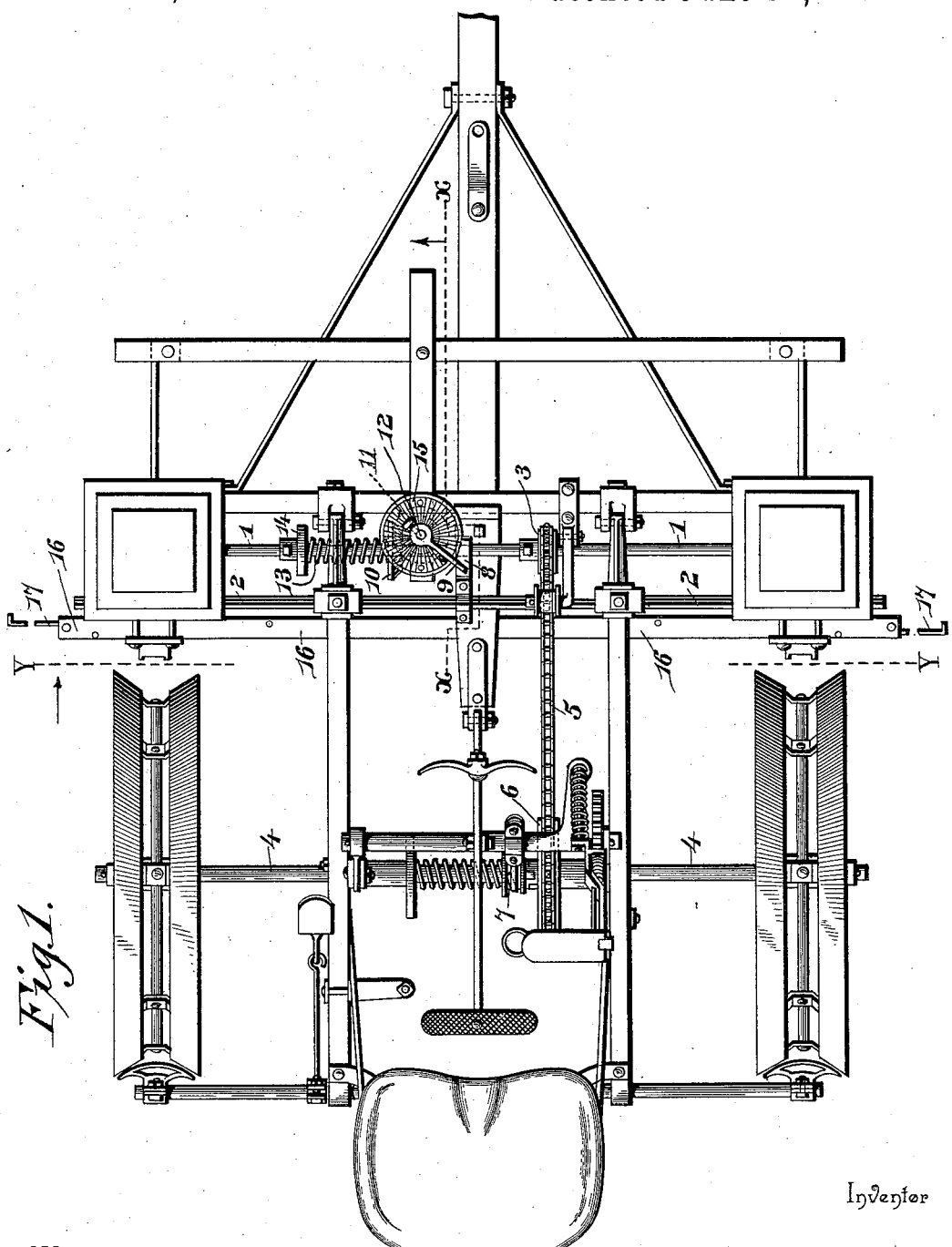

(No Model.) 3 Sheets—Sheet 3.

G. J. HAAS.
CORN PLANTER.

No. 585,095. Patented June 22, 1897.

Witnesses
Jas. H. McCathran
V. B. Hillyard.

Inventor
George J. Haas
By his Attorneys,
C. A. Snow & Co.

UNITED STATES PATENT OFFICE.

GEORGE J. HAAS, OF PRAIRIE DU SAC, WISCONSIN.

CORN-PLANTER.

SPECIFICATION forming part of Letters Patent No. 585,095, dated June 22, 1897.

Application filed December 23, 1896. Serial No. 616,742. (No model.)

*To all whom it may concern:*

Be it known that I, GEORGE J. HAAS, a citizen of the United States, residing at Prairie du Sac, in the county of Sauk and State of Wisconsin, have invented a new and useful Corn-Planter, of which the following is a specification.

This invention relates to planters, and more particularly to that class of seeding-machines for sowing corn or other grain in check-rows. The principal object is the provision of an indicating mechanism for designating the position of the hills without reference to the ground, said mechanism comprising a properly-graduated dial and a pointer coöperating therewith, the said pointer being in gear with the seeding mechanism, so as to rotate in unison therewith and in conjunction with the dial indicating the dropping of the seed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 4:
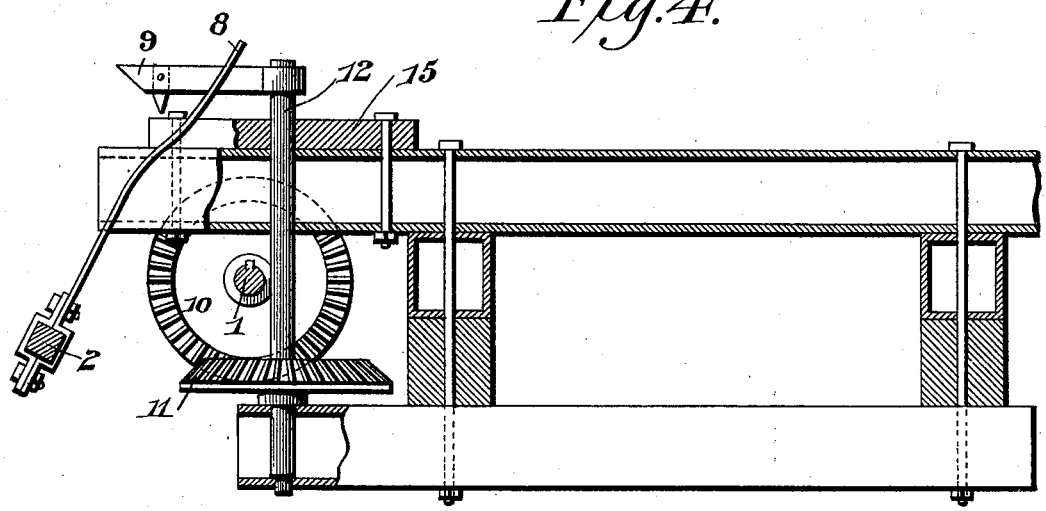
Figure 5:
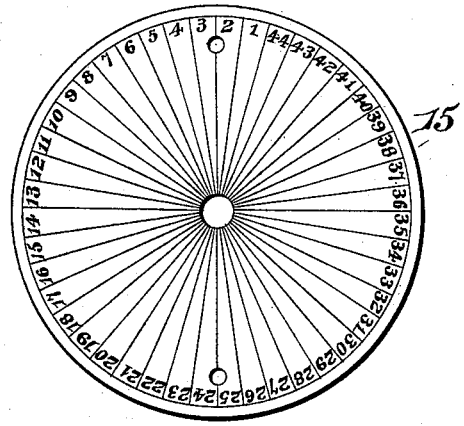
Figure 6:
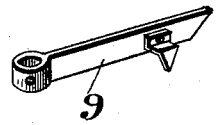
Figure 7:
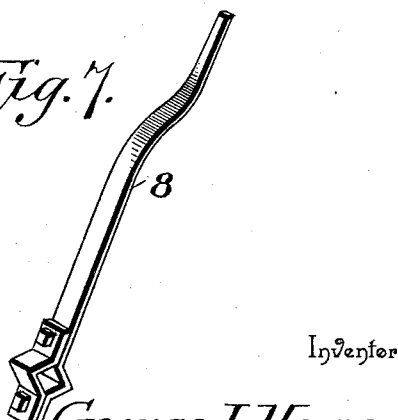

Figure 1 is a top plan view of a planter embodying the vital features of this invention. Fig. 2 is a transverse section on the line Y Y of Fig. 1, looking to the front, as indicated by the arrow. Fig. 3 is a sectional view of the tube supporting the slides for properly positioning the planter at the end of a row prior to recrossing the field. Fig. 4 is a detail section on the line X X of Fig. 1, looking in the direction of the arrow. Fig. 5 is a face view of the dial. Fig. 6 is a detail view of the pointer which coöperates with the dial. Fig. 7 is a detail view of the arm secured to one of the operating-shafts and adapted to be operated by means of the pointer.

Corresponding and like parts are referred to in the following description and indicated in the several views of the accompanying drawings by the same reference-characters.

The planter illustrated is of ordinary construction and is shown for the sake of giving a clear idea as to the proper relation and workings of the indicating mechanism, which constitutes the vital feature of the present invention. The runner and wheel frames are coupled and equipped in the ordinary way, and as they form no part of the present invention it is not deemed necessary to refer to or describe the working parts supported thereby and not having any direct connection with the indicating mechanism with which the present invention deals directly.

One of the operating-shafts is designated by the numeral 1 and the other by the numeral 2, and a sprocket-wheel 3 is secured upon the shaft 1 and is driven from the axle 4 by means of a sprocket-chain 5, passing around the sprocket-wheel 3 and a sprocket-wheel 6, mounted upon the axle 4 and caused to revolve therewith by a clutch 7 in the ordinary manner, said clutch being under the control of the driver, so as to be operated for throwing the sprocket-wheel 6 and the seed-dropping mechanism into or out of gear, as required. An arm 8 is secured to the shaft 2 and is vibrated by means of a pointer 9 so as to drop the seed at the proper time to effect a planting in check-rows.

A bevel-gear 10 is slidingly mounted upon the shaft 1 and meshes with a companion bevel-gear 11, secured to a vertical shaft 12, and a spring 13, mounted upon the shaft 1 and held in place by a collar 14, normally bears against the bevel-gear 10, so as to hold it in mesh with the bevel-gear 11. The pointer 9 is secured to the upper end of the vertical shaft 12 and travels over a stationary dial 15, which is suitably graduated to indicate the dropping of the seed. The planter shown is geared so as to drop the seed at every three feet eight inches apart, and the dial is graduated from "1" to "44," each graduation representing an inch advanced by the machine over the field, and when the machine has moved a distance corresponding to forty-four inches the pointer 9 will have struck the arm 8 and caused the dropping of the seed. Obviously if the machine is constructed to sow the seed at a greater or less distance apart the dial will be correspondingly graduated so that at each revolution of the pointer thereover the machine will drop the seed.

A tube or hollow bar 16 is arranged transversely of the machine in the rear of the hoppers, and bars 17 are slidably mounted therein and are intended to fix the position of the machine at the end of a row prior to recrossing the field. When the machine reaches the end of a row, the bar 17, corresponding to the row of hills, is drawn out, and the last hill marked by indenting the ground, and after the machine is turned the other bar 17 is similarly drawn out and used to fix the position of the machine, so that upon recrossing the field the machine will aline with the row previously planted, thereby insuring the sowing of the grain in parallel lines.

When the machine reaches the end of a row and the pointer stops opposite, say, "44" on the dial, and after turning the machine and properly positioning it for recrossing the field the pointer should indicate "40" on the dial, it is known that the machine has traveled four inches in making the turn, and in order to correctly position the seed-dropping mechanism the pointer must be moved so as to indicate "44," thereby making allowance for the space or distance traveled by the machine in making the turn, and after the pointer has been set back four inches or brought opposite the numeral "44" on the dial the machine is in condition for properly planting the seed on the return travel.

In order to admit of the pointer 9 being moved backward, the bevel-wheel 10 must be thrown out of gear with the bevel-gear 11, and the spring 13 provides for this operation, the bevel-wheel 10 being grasped by the hand and moved away from the bevel-wheel 11, or any appliance may be provided for effecting a like result.

Having thus described the invention, what is claimed as new is—

1. In a planter, the combination with the operating-shafts 1 and 2, of an arm applied to the shaft 2, and a second arm or pointer driven by means of the shaft 1 and adapted in its travel to engage with the first-mentioned arm for actuating it and the shaft 2 to which it is attached, substantially as and for the purpose set forth.

2. In a planter, the combination with the operating-shafts 1 and 2, of an arm applied to the shaft 2, a second arm or pointer adapted to engage with the first-mentioned arm for actuating it and the shaft 2, and means for throwing the second arm or pointer into and out of gear with the shaft 1, substantially in the manner set forth for the purpose described.

3. In a planter, the combination with the operating-shafts 1 and 2, of an arm applied to the shaft 2, a vertical shaft 12 bearing an arm or pointer to engage with the first-mentioned arm, intermeshing gearing between the vertical and operating shafts 12 and 1, and means for throwing the intermeshing gearing into and out of operative relation, substantially as set forth for the purpose described.

4. In a planter, the combination of operating-shafts 1 and 2, an arm applied to the shaft 2, a dial, a vertical shaft, a pointer attached to the vertical shaft and coöperating with the dial, and adapted to engage with the aforesaid arm, a gear-wheel secured to the vertical shaft, a companion gear-wheel slidably mounted on the shaft 1 and rotatable therewith, and a spring for normally holding the two gear-wheels in mesh, substantially as and for the purpose set forth.

In testimony that I claim the foregoing as my own I have hereto affixed my signature in the presence of two witnesses.

GEORGE J. HAAS.

Witnesses:
GREGOR FISCHER,
J. S. TRIPP.